United States Patent Office 3,453,332
Patented July 1, 1969

3,453,332
HYDROXYLATION OF AROMATIC COMPOUNDS
Jerome A. Vesely, Park Ridge, and George L. Hervert, Downers Grove, Ill., assignors to Universal Oil Products Company, Des Plaines, Ill., a corporation of Delaware
No Drawing. Filed Nov. 29, 1967, Ser. No. 686,742
Int. Cl. C07c 37/00, 43/20, 27/00
U.S. Cl. 260—613         9 Claims

ABSTRACT OF THE DISCLOSURE

The hydroxylation of aromatic compounds is effected by treating aromatic compounds with hydrogen peroxide in the presence of a catalyst comprising a hydrogen fluoride-carbon dioxide complex.

---

This invention relates to a process for the hydroxylation of aromatic compounds. More particularly, the invention is concerned with a process whereby one or more hydroxyl groups are introduced on the nucleus of an aromatic compound.

Hydroxylated aromatic compounds are finding a wide variety of uses in the chemical field. For example, hydroquinone is an important chemical which is utilized in photographic developers, in dye intermediates, in medicine, as an antioxidant for fats and oils, as an inhibitor in coating compounds for rubber, stone and textiles, in paints and varnishes, as well as in motor fuels and oils. In addition, it is an intermediate for preparing mono- and dibenzyl ethers of hydroquinone, the latter compounds being used as stabilizers, anti-oxidants, solvents, as well as being used in perfumes, plastics, and pharmaceuticals. Catechol finds a wide variety of uses as an antiseptic in photography, dye-stuffs, antioxidants and light stabilizers. Furthermore, it is an intermediate for the preparation of the dimethyl ether of catechol which is used as an antiseptic and for the methyl ether of catechol which is guaiacol, guaiacol being an important component of many medicines.

Likewise, phenol and cresols are used in phenolic resins, as disinfectants, flotation agents, surfactants, scouring compounds, lube oil additives, photographic developers, intermediates in ink, paint and varnish removers, etc. In addition, hydroxy substituted aromatic carbohydrate derivatives may be used as intermediates in detergents, water-soluble pharmaceuticals, explosives, gelling agents, surface coatings, resins and oxidation inhibitors.

It is therefore an object of this invention to provide a process for preparing hydroxylated aromatic compounds.

A further object of this invention is to provide a process for introducing hydroxyl substituents in the nucleus of an aromatic compound to provide useful chemical compounds.

In one aspect, an embodiment of this invention is found in a process for the nuclear hydroxylation of an aromatic compound which comprises treating said compound with hydrogen peroxide at hydroxylation conditions in the presence of a catalyst comprising a hydrogen fluoride-carbon dioxide ecomplex, and recovering the resultant hydroxylated compound.

A specific embodiment of this invention is found in a process for the nuclear hydroxylation of an aromatic compound which comprises treating benzene with an aqueous solution of hydrogen peroxide containing from about 5% to about 90% hydrogen peroxide at a temperature in the range of from about 0° to about 40° C. and at a pressure in the range of from about ambient to about 100 atmospheres in the presence of a catalyst comprising a hydrogen fluoride-carbon dioxide complex, and recovering the resultant mixture of phenol, catechol and hydroquinone.

Other objects and embodiments will be found in the following further detailed description of this invention.

As hereinbefore set forth, the present invention is concerned with a process for introducing one or more hydroxyl substituents on the nucleus or ring of an aromatic compound, said hydroxylation being effected by treating an aromatic compound with hydrogen peroxide in the presence of a catalyst comprising a hydrogen fluoride-carbon dioxide complex at hydroxylation conditions. Starting materials which may be utilized in the process of this invention will comprise aromatic compounds. The term "aromatic compounds" as used in the present specification and appended claims will refer to aromatic hydrocarbons and derivatives thereof and will include aromatic hydrocarbons such as benzene, naphthalene, anthracene, chrysene phenanthrene, etc.; aromatic hydrocarbons containing primary, secondary and tertiary alkyl substituents such as toluene, o-xylene, m-xylene, p-xylene, ethylbenzene, n-propylbenzene, cumene (isopropylbenzene), t-butylbenzene, 1-methylnaphthalene, 2-methylnaphthalene, 1-ethylnaphthalene, 2-ethylnaphthalene, 1,2-dimethylnaphthalene, 1,2-diethylnaphthalene, methylbiphenyl, ethylbiphenyl, cyclohexylbenzene, etc., hydroxy-substituted aromatic compounds such as phenol, hydroquinone, catechol, resorcinol, 1-hydroxynaphthalene, 2-hydroxynaphthalene, 1,2-dihydroxynaphthalene, etc., alkoxy-substituted aromatic compounds such as a anisole, phenetol, n-propoxybenzene, o-methylanisole, m-methylanisole, p-methylanisole, m-ethylanisole, o-methylphenetol, m-methylphenetol, p-methylphenetol, etc.; haloalkyl aromatic compounds such as o-chlorotoluene, m-chlorotoluene, p-chlorotoluene, o-bromotoluene, m-bromotoluene, p-bromotoluene, o-chloroethylbenzene, m-chloroethylbenzene, p-chloroethylbenzene, o-bromoethylbenzene, m-bromoethylbenzene, 2-chloro-1-methylnaphthalene, 2-bromo-1-methylnaphthalene, 4-chloro-1-methylnaphthalene, 4-bromo-1-methylnaphthalene, 2-chloro-1-ethylnaphthalene, 4-bromo-1-ethylnaphthalene, etc.; aromatic carbohydrate derivatives of aromatic compounds such as 1,1-diphenyl-1-desoxy-D-glucitol, 1,1-ditolyl-1-desoxy-D-glucitol, 1,1-bis-(p-isopropylphenyl)-1-desoxy-D-glucitol, 1,1-bis-(p-hydroxyphenyl)-1-desoxy-D-glucitol, the corresponding aromatic derivatives of other hexoses (fructose, sorbose, tagatose, psicose, idose, gluose, toalose), glycolaldehyde, trioses, tetraoses, pentoses, etc. It is to be understood that the aforementioned compounds are only representative of the type of aromatic hydrocarbons and derivatives thereof which may be utilized as starting materials in the hydroxylation process of the present invention and that said invention is not necessarily limited thereto. Utilizable aromatic derivatives may be represented by the following generic formula: $R_mArX_n$ in which Ar is a monocyclic or polycyclic aromatic hydrocarbon nucleus, R is independently selected from the group consisting of n-alkyl, sec-alkyl, tert-alkyl, cycloalkyl, hydroxyl, alkoxyl and hydroxyalkyl, radicals, X is independently selected from the group consisting of hydrogen, halogen and nitro substituents, $m$ and $n$ are integers of at least one. It is also contemplated within the scope of this invention that heterocyclic compounds such as quinoline may be treated with hydrogen peroxide in the presence of a hydrogen fluoride-carbon dioxide catalyst complex according to the process of this invention, although not necessarily with equivalent results.

As hereinbefore set forth, it has now been discovered that the desired hydroxylated aromatic compounds may be obtained by treating an aromatic compound with hydrogen peroxide in the presence of a catalyst comprising a hydrogen fluoride-carbon dioxide complex. Heretofore, it has been difficult to hydroxylate certain aromatic compounds including unalkylated benzene or naphthalene derivatives such as benzene, naphthalene, etc.; halobenzenes such as chlorobenzene, bromobenzene, etc.; nitrobenzenes, etc. These compounds, in the absence of a hydrogen fluoride-carbon dioxide complex will usually react less substantially than the corresponding alkylated, alkoxylated or hydroxylated derivatives and will yield a difficulty separatable mixture of polyhydroxy aromatic compounds or other derivatives thereof. Therefore, by effecting the hydroxylation in the presence of the catalyst complex of the present invention, it is now possible to hydroxylate benzene, naphthalene, etc., to obtain the desired mono- or polyhydroxy substituted compounds in a state whereby the separation is easily accomplished with an absence of any high boiling tarry or high melting solid material which can not be characterized.

Likewise, it has also been discovered that by utilizing a hydrogen fluoride-carbon dioxide complex as the catalyst in the hydroxylation of aromatic compounds which contain alkyl, alkoxy or hydroxy substituents, it is possible to shorten the addition time of the hydrogen peroxide as well as being able to utilize a lesser amount of the catalyst complex, that is, a lower inventory of hydrogen fluoride will be required to effect a maximum conversion of the feed stock to the desired hydroxylated derivatives. This in turn will permit the reaction to be carried out at a decreased cost with a correspondingly more attractive return on the initial investment of the apparatus required to effect the reaction.

It is also contemplated within the scope of this invention that the hydroxylation of the aromatic compounds may also be effected utilizing carbon dioxide as a complex with other catalysts such as boron trifluoride or Friedel-Crafts metal halides such as aluminum chloride, ferric chloride, zinc chloride, etc., and other hydroxylation agents including peroxides such as t-butyl peroxides, propyl peroxide, propyl hydroperoxide, etc., or peracids such as performic acid, peracetic acid, perpropionic acid, perbutyric acid, monoperphthalic acid, trifluoroperacetic acid, etc., although not necessarily with equivalent results.

The process of this invention is effected by treating an aromatic compound of the type hereinbefore set forth in greater detail with hydrogen peroxide in the presence of a catalyst comprising a hydrogen fluoride-carbon dioxide complex at hydroxylation conditions. The hydrogen peroxide may be present in an aqueous solution containing from 5 up to 90% or more hydrogen peroxide. The preferably hydrogen peroxide solution will contain a 30-50% or higher concentration of hydrogen peroxide inasmuch as when utilizing a lesser amount, the aqueous portion of the solution will tend to dilute the catalyst which is preferably charged to the reaction zone in anhydrous form. When the concentration of the hydrogen fluoride in the catalyst complex falls below a figure of about 60 to 70%, the reaction will slow down and eventually cease. Therefore, it is necessary to maintain the concentration of hydrogen fluoride in an amount greater than 60% and preferably greater than 80% and thus necessitate the use of a relatively concentrated hydrogen peroxide solution. It is also contemplated, if so desired, that an additional compound such as boron trifluoride or a ferrous fluoborate having the formula: $FeF_2 \cdot BF_3$ may be utilized as a promoter to increase the catalytic acidity and thereby permit the reaction to proceed in such a manner as to provide increased yields of the desired product. In addition, the reaction is effected under hydroxylation conditions which will include temperatures ranging from about $-10°$ up to about $100°$ C. or more and preferably at a temperature in the range of from about $0°$ to about $40°$ C. The reaction pressures which are utilized will range from ambient up to about 100 atmospheres, the superatmospheric pressures being effected by the introduction of the carbon dioxide into the reaction vessel. It is contemplated that the carbon dioxide will be present in the reaction mixture in an amount in the range of from about 15 to about 50 weight percent of the catalyst phase. The amount of carbon dioxide which is present in the reaction mixture will depend, in certain instances, upon the product distribution of the various isomers which may be desired. For example, when hydroxylating phenol in the absence of carbon dioxide, or when carbon dioxide is present within the lower level of the range hereinbefore set forth, the predominant product will comprise the 1,4-dihydroxybenzene (hydroquinone) isomer, while a lesser amount of the 1,2-dihydroxybenzene (catechol) isomer will be present. However, when carbon dioxide is present in the reaction mixture in the upper level of the range, the product distribution will be reversed and the 1,2-dihydroxybenzene isomer will be present as the major portion of the yield with a correspondingly lesser amount of the 1,4-dihydroxybenzene isomer being produced.

The obtention of either a monohydroxylated aromatic compound or polyhydroxylated aromatic compound can be varied according to the amount of aromatic compound which is treated with the hydrogen peroxide. For example, if a monohydroxylated aromatic compound is desired, an excess of the starting aromatic compound will be used. Conversely, if a polyhydroxylated aromatic compound comprises the desired product, the relative amount of hydrogen peroxide which is used will be increased. Generally speaking, the aromatic compound will be present in a mole ratio in the range of from about 3:1 to about 15:1 moles of aromatic compound per mole of hydrogen peroxide, although greater or lesser amounts of aromatic compounds may also be used.

The process of this invention may be effected in any suitable manner and may comprise either a continuous or batch type operation. For example, when a batch type operation is used, a quantity of the aromatic compound to be hydroxylated is pressed in an appropriate apparatus such as for example, a stirred or rotating autoclave, along with the hydrogen fluoride. The autoclave is then heated or cooled to the desired temperature and maintained thereat during the reaction period which may vary from about 0.5 hour up to about 5 hours or more in duration. The carbon dioxide is pressed in until the desired weight percent of the catalyst complex has been reached. Following this, the hydrogen peroxide is added thereto under controlled conditions and the reaction is allowed to proceed for the predetermined residence time. By utilizing the carbon dioxide as a component of the catalyst system in the reaction, it has also been discovered that another advantage is present in that said carbon dioxide will act as an internal coolant thereby allowing the hydrogen peroxide to be added during a shorter period without having the corresponding sharp and contained rise in the reaction temperature occur. Upon completion of the desired residence time, the excess pressure is vented and the catalyst is purged from the reactor utilizing a stream of inert gas such as nitrogen as the purging agent. The reaction mixture is recovered from the reactor and subjected to conventional means for recovery of the desired product, said means including washing the mixture with an inert organic solvent, neutralizing any hydrogen fluoride which may still be present, flashing off the solvent and subjecting the reaction mixture to fractional distillation to recover the desired compound.

It is also contemplated within the scope of this invention that the process described herein may be effected in a continuous manner of operation. When such a type of operation is used, the aromatic compound is continuously charged to a reaction zone which is maintained at the proper operating conditions of temperature and pressure, said reaction zone also containing the hydrogen fluoride-carbon dioxide catalyst complex. In addition, the hydrogen peroxide in the form of an aqueous solution containing from 5% up to about 90% or more hydrogen peroxide is continuously charged to the reaction zone. As hereinbefore set forth, carbon dioxide will be present in the reaction zone in an amount ranging from about 15% to about 50% by weight of the catalyst complex thereby permitting the addition of the hydrogen peroxide to be effected in a shorter period of time without a corresponding increase in the reaction temperature. If so desired, the hydrogen fluoride-carbon dioxide complex may also be continuously charged to the reaction zone and the reaction allowed to proceed for a predetermined period of time following which the reactor effluent is continuously withdrawn. The reactor effluent is continuously withdrawn from the reactor and subjected to treatment similar to that hereinbefore set forth to recover the desired hydroxylated aromatic compounds.

Examples of hydroxylated aromatic compounds which may be prepared according to the process of this invention include phenol, catechol, hydroquinone, hydroxyquinone, pyrogallol, guaiacol, o-hydroxytoluene-(o-cresol), p-hydroxytoluene-(p-cresol), 2-hydroxy-p-xylene, 4-hydroxy-o-xylene, 2-hydroxyethylbenzene-(o-ethylphenol), 2,4-dihydroxyethylbenzene, 2-hydroxy-p-cumene, 2-hydroxycumene, 4-hydroxycumene, 2-hydroxy-t-butylbenzene, 4 - hydroxy-t-butylbenzene, 1-hydroxynaphthalene, 2 - hydroxynaphthalene, 1,2 - dihydroxynaphthalene, 2 - hydroxy-1-methylbenzene, 2,4-dihydroxy-1-methylnaphthalene, 1-hydroxy-2-methylnaphthalene, 1,4-dihydroxy-2-methylnaphthalene, 2-hydroxy-1-methylanthracene, 2,4-hydroxy-1-methylanthracene, 2-hydroxyphenetol, 2,4-dihydroxyanisole, 2,4-dihydroxyphenetol, 2-hydroxy-p-methylanisole, 2-hydroxy-p-ethylanisole, 2-hydroxychlorobenzene, 4-hydroxy-1-benzene, 4-hydroxychlorobenzene, 2,4-dihydroxybenzene, 2-hydroxynitrobenzene, 4-hydroxynitrobenzene, 2,4-dihydroxynitrobenzene, 2-hydroxy-o-chlorotoluene, 2-hydroxy-o-bromotoluene, 4-hydroxy-o-chlorotoluene, 4-hydroxy-o-bromotoluene, 5-hydroxy-o-chlorotoluene, 5-hydroxy-o-bromotoluene, 1,1-di(p - hydroxyphenyl)-1-desoxy-D-manitol, 1,1-di(p-hydroxyphenyl)-1-desoxy-D-glucitol, etc. It is to be understood that the aforementioned compounds are only representatives of the class of hydroxylated aromatic compounds which may be prepared by hydroxylating an aromatic compound by treatment with hydrogen peroxide in the presence of a hydrogen fluoride-carbon dioxide catalyst complex and that the present invention is not necessarily limited thereto.

The following examples are given to illustrate the process of the present invention which, however, are not intended to limit the generally broad scope of the present invention in strict accordance therewith.

Example I

In this example, 235 g. (3.0 mole) of benzene were placed in a stainless steel turbomixer autoclave. Following this, 286 g. (14.3 mole) of hydrogen fluoride were charged thereto. Carbon dioxide in an amount of 90 g. which corresponded to 23.9 weight percent of the catalyst phase was added and thereafter 32.8 g. of a 30% aqueous hydrogen peroxide solution was gradually charged to the reactor during a period of 80 minutes. The mole ratio of benzene to hydrogen peroxide was 10.3:1. The mixture was stirred for an additional period of 15 minutes, the temperature during the 95 minutes of contact time was maintained in a range of from about 3° to about 11° C. while the pressure in the autoclave was in a range of from about 169 to about 218 pounds per square inch. At the end of this time, the pressure was vented and the hydrogen fluoride was swept out of the autoclave with a stream of nitrogen for a period of 2 hours before the autoclave was opened.

The reaction mixture was transferred to a beaker and the reactor parts were washed with benzene, the washing being added to the reaction product. The solution was thereafter decanted into another vessel thereby separating out a small amount of an aqueous acid phase which contained some benzene-insoluble product. The decanted benzene solution was treated to remove residual hydrogen fluoride, filtered under suction and distilled to remove the benzene. The benzene-insoluble product which remained in the reactor was combined with that product in the aqueous acid phase and extracted with ether. Following this, the bottoms from both product segments were combined and subjected to fractional distillation under reduced pressure. There was recovered 20 g. of reaction product which consisted of 10.0 g. of phenol, 2.5 g. of catechol and 5.9 g. of hydroquinone along with 1.6 g. of other product.

Example II

In this experiment, a charge comprising 256 g. (2.0 mole) of naphthalene was placed in an apparatus similar to that set forth in Example I above, after which 370 g. (18.5 moles) of anhydrous hydrogen fluoride were also placed in the autoclave. Thereafter, 80 g. of carbon dioxide which corresponded to 17.8 weight percent of the catalyst phase was added. The autoclave was sealed and 32.8 g. of a 30% aqueous hydrogen peroxide solution was charged to the autoclave during the period of 54 minutes. The mole ratio of naphthalene to hydrogen peroxide was 6.9:1. The autoclave was maintained at a temperature in the range of from about 4° to 11° C. and at a pressure ranging from 165 to 210 pounds per square inch during the addition period plus an additional stirring period of 16 minutes. At the end of the residence time, the hydrogen fluoride was purged from the autoclave by means of a stream of nitrogen for a period of about 2 hours. The autoclave was opened and the reaction product recovered. The autoclave was washed with benzene and the washings combined with the reaction product. A phase-separation occurred when the solution was decanted into a second vessel. After treatment in a manner similar to that set forth in Example I above, the bottoms were combined with the bottoms from the ether extract of the aqueous layer and subjected to fractional distillation. There was recovered 32.3 g. of product which consisted of 12.6 g. of 1-hydroxynaphthalene, 3.9 g. of 2-hydroxynaphthalene and 4.0 g. of 1,5-dihydroxynaphthalene as well as 11.8 g. of other dihydroxynaphthalenes along with some higher boiling products.

Example III

To a stainless steel turbomixer autoclave was added 361 g. (3.0 moles) of cumene and 200 g. (5.0 mole) of hydrogen fluoride. Carbon dioxide in an amount of 82 g. amounting to 29.1 weight percent of the catalyst phase was added to the autoclave and thereafter 32.8 g. of a 30% aqueous hydrogen peroxide solution was added during a period of 110 minutes. The autoclave was maintained at a temperature of from about 4° to about 10° C. by means of an ice bath and a pressure ranging from 175 to 235 pounds per square inch was maintained during the addition of the hydrogen peroxide plus an additional period of 10 minutes for stirring. At the end of this time, the reactor was treated in a manner similar to that set forth in the above examples and after recovery of the reaction mixture this also was treated in a manner similar to that hereinbefore set forth. After fractional distillation under reduced pressure, there was obtained 8.9 g. of ortho-, para-, and metaisopropylphenols in yields of 12 mole percent, 9 mole percent and 2 mole percent respectively. In addition, 11.4 g. which was approximately 41 weight percent of the total product was found by infrared to consist chiefly of 2,4-dihydroxy isopropylbenzene(4-isopropylresorcinol) along with minor amounts of 3,4-dihydroxy and 2,5-dihydroxy propylbenzene isomers.

Example IV

To a stainless steel turbomixer autoclave was charged 282 g. (3.0 mole) of phenol along with 228 g. (11.4 mole) of hydrogen fluoride. In addition, 47 g. of carbon dioxide which corresponded to 17 weight percent of the catalyst phase was charged to the reactor which was thereafter sealed. The autoclave was cooled to a temperature of about 2° by means of an ice bath, following which, 32.8 g. of a 30% aqueous hydrogen peroxide solution was added during a period of about 39 minutes. The temperature of the autoclave was maintained in a range of from about 2° to about 8° during the peroxide addition and for an additional 17 minutes stirring time. At the end of this time, the autoclave was vented and the hydrogen fluoride swept therefrom utilizing a stream of nitrogen for a period of about 2 hours. The reaction product was treated in a manner similar to that hereinbefore set forth and the reaction product recovered. There was obtained 15.0 g. of catechol and 16.4 g. of hydroquinone which amounted to a 46 mole percent of catechol and a 51 mole percent of hydroquinone.

Example V

To illustrate the importance of effecting the hydroxylation in the presence of carbon dioxide it has also been discovered that by varying the amount of carbon dioxide present per weight percent of the catalyst phase, it is possible to obtain varying amounts of hydroquinone and catechol. For example, it has been found that in the absence of carbon dioxide hydroquinone has always been the predominant dihydroxybenzene obtained in the hydroxylation of phenol, the ratio of hydroquinone to catalyst being from 1.2 to 1.5 moles of hydroquinone per mole of catechol. However, as will be hereinafter set forth in greater detail, when utilizing carbon dioxide in an amount of approximately 40 weight percent of the catalyst phase, the combined yield of hydroquinone and catechol resulting from the hydroxylation of phenol will result in a greater than 90% mole yield, the catechol being in a predominant ratio of 0.8 mole of hydroquinone to the mole of catechol.

Therefore, 282 g. (3.0 mole) of phenol was charged to an autoclave along with 112 g. (5.6 mole) of hydrogen fluoride and 69 g. of carbon dioxide which amounted to 38 weight percent of the catalyst phase. The autoclave was sealed and 32.8 g. of a 30% aqueous hydrogen peroxide solution was added during a period of 60 minutes. The reactor was maintained at a temperature in the range of from about 5° to about 12° C. by means of an ice bath during the hydrogen peroxide addition period. The reaction mixture was stirred for an additional period of 10 minutes making a total contact time of 70 minutes.

At the end of this time, the autoclave was opened and the reaction mixture treated in a manner similar to that hereinbefore set forth. The desired product comprising the dihydroxylated product was recovered and found to comprise 48 mole percent of catechol and 40 mole percent of hydroquinone which amounted to a mole ratio of 0.8 mole of hydroquinone per mole of catechol.

We claim as our invention:

1. A process for the nuclear hyroxylation of an aromatic compound having the formula:

$$R_mArX_n$$

in which Ar is a monocyclic or polycyclic aromatic hydrocarbon nucleus, R is independently selected from the group consisting of n-alkyl, sec-alkyl, tert-alkyl, cycloalkyl-hydroxyl, alkoxyl and hydroxyalkyl radicals, X is independently selected from the group consisting of hydrogen, halogen and nitro substituents, $m$ and $n$ are integers of at least one, which comprises treating said aromatic compound with an aqueous hydrogen peroxide solution containing from about 5% to about 90% hydrogen peroxide at a temperature in the range of from about −10° to about 100° C. and a pressure in the range of from about ambient to about 100 atmospheres in the presence of a catalyst comprising a hydrogen fluoride-carbon dioxide complex wherein the concentration of hydrogen fluoride in the catalyst complex is greater than 60% by weight and the concentration of carbon dioxide is at least about 15% by weight, and recovering the resultant hydroxylated compound.

2. The process as set forth in claim 1, further characterized in that said aromatic compound comprises an aromatic hydrocarbon.

3. The process as set forth in claim 1, further characterized in that said aromatic compound comprises an alkylaromatic hydrocarbon.

4. The process as set forth in claim 1, further characterized in that said aromatic compound comprises an hydroxyaromatic compound.

5. The process as set forth in claim 1, further characterized in that said aromatic compound comprises benzene and said hydroxylated compound comprises a mixture of phenol, hydroquinone and catechol.

6. The process as set forth in claim 1, further characterized in that aromatic compound comprises toluene and said hydroxylated compound comprises a mixture of cresols.

7. The process as set forth in claim 1, further characterized in that said aromatic compound comprises naphthalene and said hydroxylated compound comprises a mixture of mono- and dihydroxynaphthalenes.

8. The process as set forth in claim 1, further characterized in that said aromatic compound comprises phenol and said hydroxylated compound comprises a mixture of hydroquinone and catechol.

9. The process as set forth in claim 1, further characterized in that said aromatic compound comprises anisole and said hydroxylated compound comprises a mixture of o-methoxy-phenol and p-methoxyphenol.

References Cited

UNITED STATES PATENTS

| | | |
|---|---|---|
| 2,437,648 | 3/1948 | Milas. |
| 2,530,369 | 11/1950 | Simons. |
| 2,644,014 | 6/1953 | Saunders. |
| 3,376,351 | 4/1968 | Amedjian et al. |
| 3,377,386 | 4/1968 | Chafetz. |

FOREIGN PATENTS 723,454  2/1955  Great Britain.

BERNARD HELFIN, *Primary Examiner.*

U.S. Cl. X.R.

260—289, 619, 620, 621, 622, 623, 624, 625, 626